Figure 1:
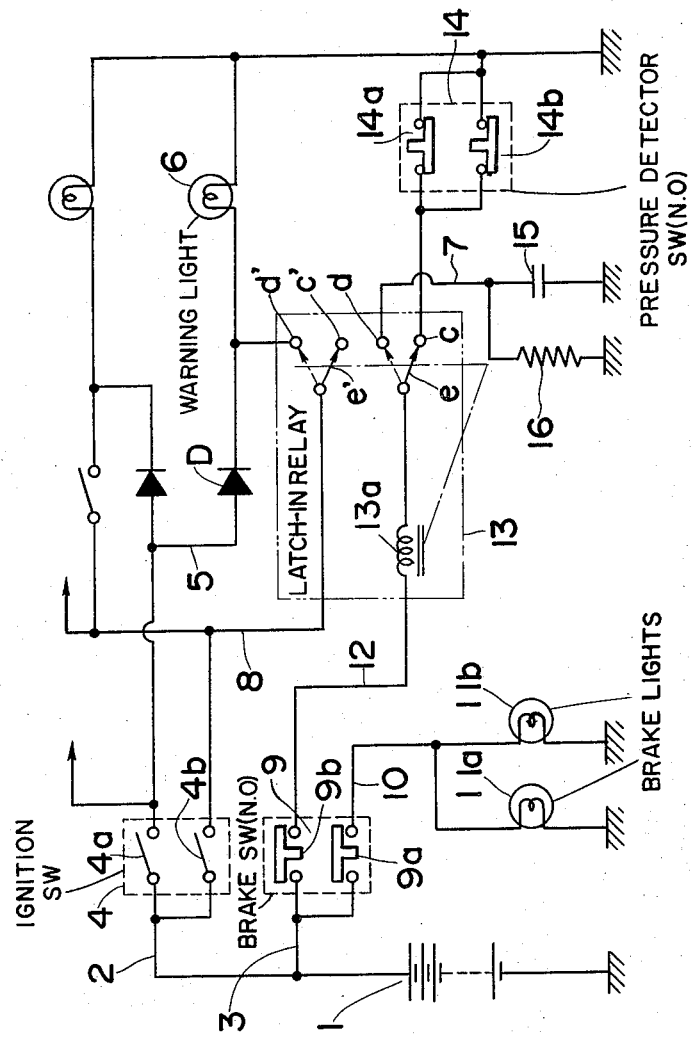

United States Patent [19]
Suzuki

[11] 3,810,088
[45] May 7, 1974

[54] FAILURE WARNING APPARATUS FOR OIL PRESSURE BRAKE

[75] Inventor: Masaru Suzuki, Chiryu, Japan

[73] Assignee: Kabushiki Kaisha Tokai Rika Denki Seisakusho, Nishikasugai-gun, Aichi-ken, Japan

[22] Filed: Aug. 18, 1972

[21] Appl. No.: 281,657

[30] Foreign Application Priority Data
Aug. 19, 1971   Japan.............................. 46-74446

[52] U.S. Cl............................... 340/52 C, 340/240
[51] Int. Cl. ........................................... G08b 21/00
[58] Field of Search ................................... 340/52 C

[56] References Cited
UNITED STATES PATENTS

| 3,423,727 | 1/1969 | Adamson | 340/52 C |
| 3,439,323 | 4/1969 | Kersting | 340/52 C |
| 3,662,333 | 5/1972 | Howard | 340/52 C |
| 3,688,255 | 8/1972 | Klein | 340/52 C |

Primary Examiner—Thomas B Habecker
Attorney, Agent, or Firm—Craig and Antonelli

[57] ABSTRACT

A failure warning apparatus for an oil pressure brake in which a latch-in relay is actuated, when the oil pressure brake is out of order, so as to light a warning lamp until the failure is repaired, thereby to prevent a driver from driving continuously without reparing a failure of the oil pressure brake.

7 Claims, 1 Drawing Figure

FAILURE WARNING APPARATUS FOR OIL PRESSURE BRAKE

The present invention relates to a failure warning apparatus for an oil pressure brake wherein a circuit connection thereof is so arranged that an electric circuit of a warning lamp for indicating failure of the oil pressure brake is kept in the closed condition causing the warning lamp to flash every time the brake pedal of the oil pressure brake is stepped on until the brake fault is repaired, and is automatically turned to the opened condition after the fault has been repaired.

In the conventional oil pressure brake of a vehicle there is provided a failure warning apparatus which indicates the failure of the oil pressure brake to a driver only when he steps on the brake pedal at the first time and which stops when he leaves go the brake pedal, so the repair thereof is sometimes postponed if he forgets the indication of the failure warning apparatus.

Accordingly, the essential object of the present invention is to provide a failure warning apparatus for an oil pressure brake wherein the operating condition of the warning apparatus such as a lamp, on failure of the oil pressure brake, is kept on without regard to the operation of the brake pedal until the failure is repaired.

Another important object of the present invention is provide a failure warning apparatus for an oil pressure brake wherein the warning apparaus operating on failure of the oil pressure brake is automatically stopped after the fault has been repaired.

A further object of the present invention is provide a failure warning apparatus for an oil pressure brake wherein the warning apparatus operating on failure of the oil pressure brake automatically indicates the operating condition in such a manner as flashing of the warning lamp every time the brake pedal of the oil pressure brake is stepped on until the failure is repaired.

A still further object of the present invention is to provide a failure warning apparatus for an oil pressure brake which is adapted to be conveniently made in various forms, which is simple and compact in design, which is durable in construction, and which is capable of performing its intended functions in an entirely satisfactory and trouble-free manner.

These and other objects and aspects of the present invention will be more clearly understood from the following description of the present invention made with reference to one preferred embodiment thereof shown, by way of example, in the accompanying drawing, in which;

FIG. 1 is an electric circuit block diagram showing a preferred embodiment in accordance with the present invention illustrating the condition in which a failure of the fluid pressure brake has been detected.

Before we proceed with the description of the present invention, it is to be noted that the concept of the present invention can be applied to a hydraulic brake apparatus in any field of industry other than the oil pressure brake of an automobile-vehicle.

Referring to FIG. 1, a power battery 1 is connected in series with an engine driving circuit 2 which is connected in parallel with a braking light circuit 3. In the engine driving circuit 2, there is provided a key switch 4 including a pair of operable switch contacts, that is, a starter switch 4a and a ignition switch 4b which are connected in parallel with each other and operated together as one unit. A disconnecting checking circuit 5 for a warning lamp 6 lighting of which indicates failure of the oil pressure brake of a vehicle is connected in series with the starter switch 4a through a diode D. On the other hand, the igniter switch 4b is connected in series with a warning lamp circuit 8 which is connected in series with the warning lamp 6 through a change-over contact d' of a latch-in relay 13, the latch-in relay 13 being connected in parallel with the diode D, the latch-in relay being a relay that maintains its contacts in the last position assumed without the need of maintaining coil energization as defined in the IEEE Standard Dictionary of Electrical and Electronic Terms.

In the braking light circuit 3, there is provided a brake switch 9 including a pair of operable switch contacts 9a and 9b which are connected in parallel with each other and operated together to the ON position when the brake pedal is stepped on. The switch contact 9a is connected in series with a driving circuit 10 having a pair of braking lamps 11a and 11b which are connected in parallel with each other while the other switch contact 9b is connected in series with a control circuit 12 for the warning lamp circuit 8. In the control circuit 12, there is provided a multiple contacts-latch-in relay 13 and an abnormal pressure-detecting switch 14 which are connected in series with each other and operated together to the On position on detection of failure in the front and back two-system oil pressure brake of a vehicle, the abnormal pressure-detecting switch 14 including a pair of operable switch contacts 14a and 14b which are connected in parallel with each other. The multiple contacts-latch-in relay 13 includes a relay coil 13a connected in series with the switch contact 9b, one shiftable contact member e which is connected in series with the relay coil 13a and performs a switching action upon energizing of the relay coil 13a, and another shiftable contact member e' which is connected in series with the ignition switch 4b and operatively cooperates with the contact member e. The contact member e normally contacts with a terminal contact c of the pressure-detecting switch 14 and switches to contact to a change-over contact d by the transfer action, while the other contact member e' normally contacts with a dummy contact c' and switches to contact to a change-over contact d', which is connected with the warning lamp 6, in accordance with the transfer action of the contact member e. The change-over contacts is connected with a time constant circuit 17 having a condenser 15 and resistor 16 which are connected in parallel with each other.

In the arrangement of this embodiment as described hereinbefore, the operation thereof will be mentioned hereinafter. If the oil pressure brake is out of order when the brake pedal is stepped on, the oil in the brake oil pressure circuit cannot increase the pressure sufficiently. Accordingly, one of the abnormal-pressure-detecting switches 14a and 14b keeps its ON position upon detection of the failure of the oil pressure in the brake oil pressure circuit, and the control circuit 12 is closed by the brake switch 9 which is actuated to the ON position at the same time, in a known manner. Thus, the coil 13a of the latch-in relay 13 is energized and the movable contact members e and e' are thereby switched from the contacts c and c' to the change-over-contact points d and d' respectively, and the warning lamp 6 is turned on through the contact member e' and the ignition switch 4b, whereby the fault is indicated. As the onorable contact members e and e' are maintained to contact with the change-over contact points d and d' by the latch-in operation of the relay 13 until the relay coil 13a is re-energized, the lighting of the warning lamp 6 is kept on through the contact member e' and the ignition switch 4b. The warning lamp 6 is turned off when the ignition switch 4b is put off, but the lamp 6 lit again when the ignition switch 4b switched on, whereby the warning indication is maintained.

Any time the brake switch 9 is switched on by stepping on the brake pedal again after the warning lamp circuit 8 has been closed by maintaining the contact member e' in contact with the point d' as described hereinbefore, the control circuit is closed to send the current to the latch-in relay 13 through the contact member e, the change-over contact d and the condenser 15 and the relay coil 13a is once re-energized to change over the pair of movable contact member e and e' to the respective points c and c'. However, as soon as the contact member e is in contact with the point c connected with the pressure-detecting switch 14, the relay coil 13a is again re-energized by the current flowing through the control circuit 12 and the pressure-detecting switch 14, whereby the pair of contact members e and e' are immediately switched back to the respective points d and d' to light the warning lamp 6 again.

On the contrary, after the fault in the oil pressure circuit of the oil pressure brake has been repaired, the pressure-detecting switch 14 cannot achieve the on condition be even if the brake switch 9 is switched on by stepping on the brake pedal. Therefore, when the pair of the contact members e and e' are changed-over from the points d and d' to the points c and c' by reenergization of the relay coil 13a upon switching on the brake switch 9, the relay coil 13a can not be reenergized since the current does not flow through the control circuit 12 and the pressure-detecting switch 14 opposite the above mentioned condition under the failure of the oil pressure brake, whereby the pair of contact members e and e' are maintained to contact with the respective points c and c' to turn the warning lamp 6 off.

According to the failure warning apparatus for an oil pressure brake of the present invention, when something goes wrong with the oil pressure brake apparatus, the latch-in relay 13 is energized upon placing of the brake switch 9 to the ON position, and the warning lamp 6 is kept on until the fault has been repaired. In this condition, every time the brake switch 9 is set to the ON position by stepping on the brake pedal before the fault is repaired, the relay cancels the lighting of the warning lamp for a very short time and immediately returns the lighting so as to make one flash, whereby necessity of repairing operation for the oil pressure brake is indicated again. But, this lighting display is cancelled by a first On operation of the brake switch after the failure has been repaired. Therefore, the apparatus of the present invention has the excellent advantages or preventing a defective vehicle from being driven without repairing a failure of the oil pressure brake by attracting the driver's attention sufficiently.

Although the present invention has been fully described by way of example, it is to be noted that various changes and modifications are apparent to those skilled in the art concerned. Therefore, the present invention is not to be limited by the foregoing embodiments, but such changes and modifications are to be construed as included within the scope of the present invention unless otherwise they departs therefrom.

What is claimed is:

1. A failure warning apparatus for a fluid pressure brake comprising brake switch means responsive to the actuation of the brake pedal of the fluid pressure brake for closing and opening an energizing circuit path in accordance therewith, latch-in relay means having a plurality of circuit making members and a latch-in relay coil for energization via the energizing circuit path of said brake switch means for controlling the movement of said plurality of circuit making members between first and second circuit positions, an abnormal pressure detecting switch means responsive to the failure of the fluid pressure brake for providing an energizing circuit path for said relay coil, said brake switch means, said latch-in relay means and said abnormal pressure detecting switch means being connected in series with each other, a warning means energized by one of said plural circuit making members in one of the first and second positions thereof providing an energizing circuit path therefor, said latch-in relay coil being responsive to the initial closing of the energizing circuit by said brake switch means and the detection of the failure of the fluid pressure brake by said abnormal pressure detecting switch means for moving said plural circuit making members from one of the first and second position to the other position thereof for enabling energization of said warning means and time constant circuit means for completing an energizing circuit for controlling said latch-in relay coil to cause movement of said circuit making members for de-energizing said warning means after correction of the failure of the fluid pressure brake.

2. A failure warning apparatus according to claim 1, wherein said time constant circuit means controls said latch-in relay coil to cause de-energization of said warning means upon actuation of the brake pedal and closure of the energizing circuit path for said relay means by said brake switch means.

3. A failure warning apparatus according to claim 1, wherein said time constant circuit means controls said latch-in relay coil to de-energize said warning means for a predetermined period of time upon each actuation of the brake pedal after energization of said warning means has been enabled, said latch-in relay coil being responsive to the continued detection of a failure of the fluid pressure brake by said abnormal pressure detecting means for again enabling the energization of said warning means.

4. A failure warning apparatus according to claim 3, wherein said time constant circuit means includes a time constant circuit having a condenser connected with another of said plural circuit making members, said another circuit making member being operated by said relay coil in response to said abnormal pressure detecting switch means.

5. A failure warning apparatus according to claim 1, wherein said brake switch means is connected in series between a power source and said relay coil, said abnormal pressure detecting switch means having one terminal thereof connected in series with said relay coil when another of said plural circuit making members is in the first position thereof and another terminal connected to ground, an ignition switch means connected in series with the power source and said one circuit making member, said warning means having one terminal thereof connected to a second circuit position of said one circuit making member and another terminal thereof connected to ground, said time constant circuit means being connected to a second circuit position of said another circuit making member, said one and another circuit making members being movable together so as to assume the same circuit position, said one circuit making member having the first circuit position thereof as a dummy circuit position.

6. A failure warning apparatus according to claim 5, wherein said time constant circuit means comprises a time constant circuit including a condenser having one terminal connected to said second circuit position of said another circuit making member and another terminal connected to ground and a resistor having one terminal connected to the second circuit position of said another circuit making member and another terminal connected to ground.

7. A failure warning apparatus according to claim 6, wherein the fluid pressure brake is an oil pressure brake.

* * * * *